United States Patent
Sato et al.

(10) Patent No.: US 6,805,913 B2
(45) Date of Patent: Oct. 19, 2004

(54) PAINT COMPOSITION FOR AUTOMOTIVE WEATHER STRIP AND GLASS RUN, AND PROCESS FOR PRODUCING AUTOMOTIVE WEATHER STRIP AND GLASS RUN

(75) Inventors: Nobumasa Sato, Hiroshima-ken (JP); Keigo Matsumoto, Hiroshima-ken (JP); Sei Tomohiro, Hiroshima-ken (JP)

(73) Assignee: Nishikawa Rubber Co., Ltd., Hiroshima-ken (JP)

( * ) Notice: Subject to any disclaimer, the term of this patent is extended or adjusted under 35 U.S.C. 154(b) by 0 days.

(21) Appl. No.: 10/197,416

(22) Filed: Jul. 18, 2002

(65) Prior Publication Data

US 2003/0088017 A1 May 8, 2003

Related U.S. Application Data

(62) Division of application No. 09/810,616, filed on Mar. 19, 2001, now Pat. No. 6,590,027.

(30) Foreign Application Priority Data

Jul. 14, 2000  (JP) ..................................... P2000-214704

(51) Int. Cl.$^7$ ................................................ B05D 3/02
(52) U.S. Cl. ...................... 427/387; 427/302; 427/314; 427/372.2; 427/379
(58) Field of Search .................................. 427/302, 387, 427/314, 372.2, 379, 316, 385.5, 393.5, 407.1, 412.1, 382, 372, 321

(56) References Cited

U.S. PATENT DOCUMENTS

| | | | | |
|---|---|---|---|---|
| 4,759,992 A | * | 7/1988 | Tomko et al. | 428/447 |
| 4,822,835 A | | 4/1989 | Close | |
| 5,115,007 A | * | 5/1992 | Chihara et al. | 524/267 |
| 5,183,613 A | * | 2/1993 | Edwards | 264/173.19 |
| 5,306,537 A | * | 4/1994 | Gustafson et al. | 428/141 |
| 5,366,808 A | * | 11/1994 | Yip | 428/447 |
| 5,472,544 A | * | 12/1995 | Fukamachi et al. | 156/250 |
| 5,488,092 A | * | 1/1996 | Kausch et al. | 528/60 |
| 5,525,427 A | * | 6/1996 | Griswold et al. | 428/447 |
| 5,543,200 A | * | 8/1996 | Hargis et al. | 428/122 |
| 5,795,941 A | * | 8/1998 | Cree et al. | 525/240 |
| 5,994,474 A | * | 11/1999 | Wey et al. | 525/288 |
| 6,589,664 B1 | * | 7/2003 | Kobayashi et al. | 428/516 |

FOREIGN PATENT DOCUMENTS

JP          04-173885 A          6/1992

OTHER PUBLICATIONS

English Translation of JP–04–31473, Murachi, Feb. 1992.*
Derwent Abstract of Japan 04–031473, Feb. 1992, Assigned to Toyoda Gosei KK [Toza].*
Japanese Abstract No. 10 114813, dated May 6, 1998.
Database WPI Section Ch, Week 1999828, Derwent Publications Ltd., London, GB; AN 1998–316780, XP–002182527 and JP 10 114813 A.
Database WPI Section Ch, Week 1999841, Derwent Publications Ltd., London, GB; AN 1989–296659, XP–002182528 and JP 04 173885 A.

* cited by examiner

*Primary Examiner*—Jeffrey B. Robertson
(74) *Attorney, Agent, or Firm*—Sughrue Mion, PLLC

(57) ABSTRACT

A paint composition for automotive weather strips and glass runs which comprises a curable urethane-based emulsion paint having added hereto either at least two silane coupling agents selected from the group consisting of a silane coupling agent having an amino group, a silane coupling agent having an epoxy group, a silane coupling agent having a methacryloxy group and a silane coupling agent having an acryloxy group, or a reaction product obtained by previously mixing said at least two silane coupling agents. Also, discloses are processes for producing automotive weather strips.

3 Claims, 2 Drawing Sheets

1kg-LOAD APPLIED
D : ABRADING GLASS PLATE(t=3.5mm)
STROKE : 150mm
SPEED : 60cycles/min
E : COATED SAMPLE

F : COATED SITE
H : EPDM RUBBER
G : CROSSLINKED PE

F : COATED SITE
H : EPDM RUBBER

PAINT COMPOSITION FOR AUTOMOTIVE WEATHER STRIP AND GLASS RUN, AND PROCESS FOR PRODUCING AUTOMOTIVE WEATHER STRIP AND GLASS RUN

This is a divisional of application Ser. No. 09/810,616 filed Mar. 19, 2001 now U.S. Pat. 6,590,027; the disclosure of which is incorporated herein by reference.

FIELD OF THE INVENTION

The present invention relates to a paint composition for automotive weather strips and glass runs, as well as processes for producing automotive weather strips and glass runs.

BACKGROUND OF THE INVENTION

Most automotive weather strips and glass runs (which are hereunder sometimes referred to simply as "automotive weather strips") are coated with curable urethane-based paints on the surface of the substrate to impart it special functions such as wear resistance and slip property (sliding property) or provide it with better appearance.

Conventionally, curable urethane-based paints of a solvent type have been used in the manufacture of automotive weather strips; however, with the recent concern over the global environment and the health of working personnel, a need has arisen for a shift toward aqueous and other paints of a non-solvent type.

However, water which is the medium for paints of the aqueous type have more latent heat of evaporation than solvents, so the aqueous paints require more heat than paints of the solvent type in order to dry up the water after application. In addition, unlike solvent-type paints that allow adjustment of volatilization temperature and rate by combining several kinds of solvents, aqueous-type paints require preliminary drying in order to prevent "flashing" due to nearly instantaneous volatilization of water. As a result, longer drying times are required by the aqueous paints and in order to deal with this low productivity problem, it becomes necessary to build a new drying oven for shifting from the solvent-type paint to the aqueous type.

Most automotive weather strips use substrates that are made of thermosetting elastomers such as EPDM rubber (ethylene propylene rubber) or thermoplastic elastomers such as TPO (thermoplastic polyolefins).

If thermoplastic elastomers are used as the substrate, drying should be carried out at a low temperatures of 150° C. or below to prevent thermal deformation that would otherwise occur during post-application drying; however, if the paint applied is of the aqueous type, the drying operation is not highly productive since water is very difficult to dry.

The EPDM rubber as an exemplary thermosetting elastomer is nonpolar and has low sticking property and it is also hydrophobic; hence, aqueous paints cannot produce a more adhesive coat than solvent-type paints.

With a view to solving this problem, pretreatments such as corona discharge and primer application are conventionally applied to the substrate surface but problems still remain, such as high initial cost and the difficulty involved in performing positive pretreatments on complexly shaped articles.

SUMMARY OF THE INVENTION

Therefore, a first object of the invention is to provide a paint for automotive weather strips that is free from the above-mentioned defects of the prior art and which can achieve strong adhesion to the EPDM rubber without corona discharge, primer application or other pretreatments on the substrate surface while exhibiting high wear resistance.

A second object of the invention is to provide a process for producing automotive weather strips which does not require the as-applied coat to be cured completely in a drying oven but which permits it to be cured completely by the heat inertia of the drying step and which can also shorten the length of the drying oven or lower the drying temperature.

A third object of the invention is to provide a process by which automotive glass runs having high wear resistance in the bottom portion while exhibiting high softness and flexibility in the lip portions can be produced efficiently and with minimum impact on the global environment.

As a result of the extensive studies made in order to attain the above-mentioned objects, the present inventors found that the first object of the invention could be attained by adding at least two specified silane coupling agents or a product of premixing reaction between said at least two silane coupling agents to a curable urethane-based emulsion paint.

Thus, in a first aspect, the present invention relates a paint composition for automotive weather strips comprising a curable urethane-based emulsion paint having added thereto either at least two silane coupling agents selected from the group consisting of a silane coupling agent having an amino group, a silane coupling agent having an epoxy group, a silane coupling agent having a methacryloxy group and a silane coupling agent having an acryloxy group, or a reaction product obtained by previously mixing said at least two silane coupling agents.

The second object of the invention can be attained by a process for producing automotive weather strips which comprises the steps of extruding a semi-finished product of automotive weather strip while it is continuously coated with a urethane-based aqueous paint, then drying and curing the product in a heating furnace, or comprises extruding a semi-finished product of automotive weather strip, heating it, immediately followed by continuous application of a urethane-based aqueous paint, then drying and curing the product in a heating furnace, or comprises unrolling a semi-finished extruded product of automotive weather strip while it is continuously coated with a urethane-based aqueous paint, then drying and curing the extruded product in a heating furnace, wherein a silicone compound having an amino group is applied to the coated surface of the semi-finished product or extruded product after it leaves the heating furnace, or wherein a silicone compound having an amino group is incorporated in the urethane-based aqueous paint.

The third object of the invention can be attained by a process for producing automotive glass runs which comprises the steps of extruding a semi-finished product of automotive glass run as while is continuously coated with a silane-crosslinkable polyethylene, then drying and curing the product in a heating furnace, or comprises the steps of extruding a semi-finished product of automotive glass run, heating it, immediately followed by continuous coating with a silane-crosslinkable polyethylene, then drying and curing the product in a heating furnace, or comprises the steps of unrolling a semi-finished extruded product of automotive glass run while it is continuously coated with a silane-crosslinkable polyethylene, each of which processes further comprises applying an urethane resin-based aqueous paint containing a silicone compound having an amino group or a silicone compound having an amino group or a solution thereof onto the silane-crosslinkable polyethylene coat, then heating the applied product in a heating furnace to dry and cure the applied aqueous paint, silicone compound or solution and to crosslink the silane-crosslinkable polyethylene.

DETAILED DESCRIPTION OF THE INVENTION

Figure 1:
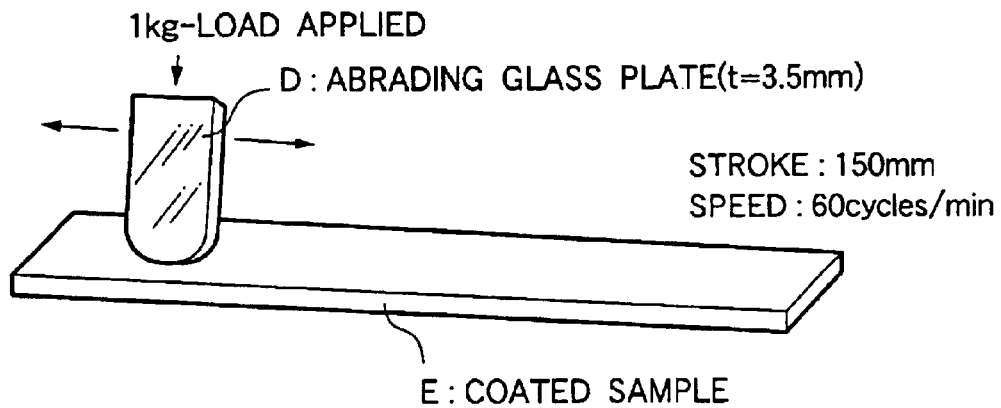
FIG. 1 is a schematic representation of an abrasion tester according to a method specified by the Japan Society for Promotion of Scientific Research.

The following is the description of a mode for carrying out the invention as it relates to a paint composition for automotive weather strips.

The curable urethane-based emulsion paint which is used as the base of the paint composition is a urethane-based emulsion paint which typically uses an isocyanate-, melamine-, epoxy- or carbodiimide-based curing agent.

Examples of the silane coupling agent having an amino group include γ-aminopropyltrimethoxysilane, γ-aminopropyltriethoxysilane and N-β-(aminoethyl)-γ-aminopropyltrimethoxysilane.

Examples of the silane coupling agent having an epoxy group include γ-glycidoxypropyltrimethoxysilane, γ-glycidoxypropyltriethoxysilane and β-(3,4-epoxycyclohexyl)ethyltrimethoxysilane.

Examples of the silane coupling agent having a methacryloxy group include γ-methacryloxypropyltrimethoxysilane, γ-methacryloxypropyltriethoxysilane, γ-methacryloxypropylmethyldiethoxysilane and 3-acryloxypropylmethoxysilane.

At least two of the silane coupling agents listed above or their reaction product is preferably added in an amount of 10 to 40 parts by weight per 100 parts by weight of the involatile content in the base curable urethane-based emulsion paint.

The following is the description of a mode for carrying out the invention as it relates to a process for producing automotive weather strips.

The substrate of automotive weather strips is not limited in any particular way but thermoplastic elastomers are preferably used.

The urethane-based aqueous paint may be a urethane-based emulsion paint which typically uses an isocyanate-, melamine-, epoxy- or carbodiimide-based curing agent.

Preferred examples of the silicone compound having an amino group include aminosilane coupling agent such as γ-aminopropyltrimethoxysilane, γ-aminopropyltriethoxysilane and N-β-(aminoethyl)-γ-aminopropyltrimethoxysilane, as well as amino-modified silicone oils.

If the silicone compound having an amino group is to be applied to the coated surface of the substrate as it emerges from the drying oven, it may be diluted with water. The application method is in no way limited and spraying and brushing may be mentioned as typical examples.

The following is the description of a mode for carrying out the invention as it relates to a process for producing automotive glass runs.

The urethane-based aqueous paint may be a urethane-based emulsion paint which typically uses an isocyanate-, melamine-, epoxy- or carbodiimide-based curing agent.

The silane-crosslinkable polyethylene which is to be applied to the bottom portion of a semi-finished extruded product of automotive glass run is as easily processable as common polyethylenes before crosslinking but, once processed, exhibits better sliding and wear-resistant properties than ultrahigh molecular-weight polyethylenes; hence, the silane-crosslinkable polyethylene is suitable for use as a sliding member in the bottom portions of glass runs that require high wear resistance.

The silane-crosslinkable polyethylene reacts with water and condenses through the removal of alcohol to thereby become crosslinked. If the aqueous paint containing the silicone compound having an amino group is applied to the silane-crosslinkable polyethylene coat, which is then dried and cured in a heating furnace, the water in the aqueous paint and the silicone compound having an amino group which has a catalytic action in the condensation of silane crosslinks by removal of alcohol work together to cause rapid crosslinking and curing of the applied silane-crosslinkable polyethylene coat. The silicone compound having an amino group offers the added advantage of promoting the curing of the as-applied aqueous paint film, thereby increasing its adhesion to the EPDM rubber or silane-crosslinkable polyethylene.

The lip portions of glass runs do not require as high wear resistance as their bottom portions. On the other hand, they should have better sealing and handling properties, higher ability to prevent rattling sound and dust scratching, and more attractive appearance; therefore, the sliding member to be used in the lip portions should not impair the softness and flexibility of the substrate rubber and is suitably based on polyurethane resins.

Preferred examples of the silicone compound having an amino group include aminosilane coupling agents such as γ-aminopropyltrimethoxysilane, γ-aminopropyltriethoxysilane and N-β-(aminoethyl) -γ-aminopropyltrimethoxysilane, as well as amino-modified silicone oils. The silicone compound having an amino group is preferably incorporated in amounts ranging from 2 to 15 parts by weight per 100 parts by weight of the involatile content of the aqueous paint.

Coating with the silane-crosslinkable polyethylene may be accomplished by coextrusion with rubber or it may be applied after vulcanization while the rubber is still hot.

Figure 2:
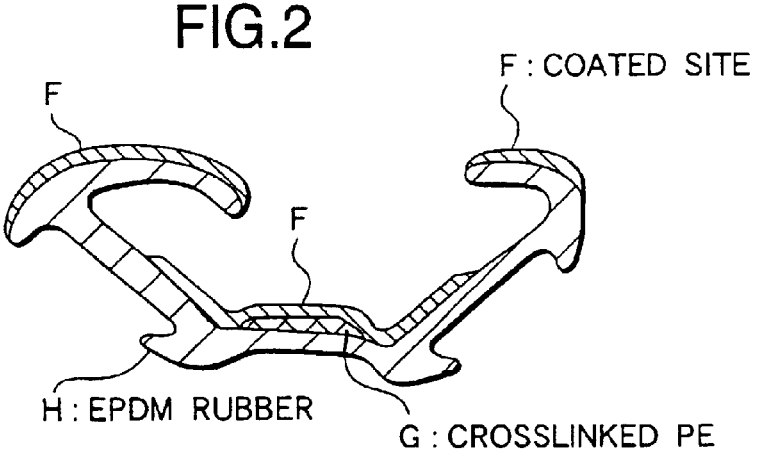
FIG. 2 is an illustration of a glass run product.
Figure 3:
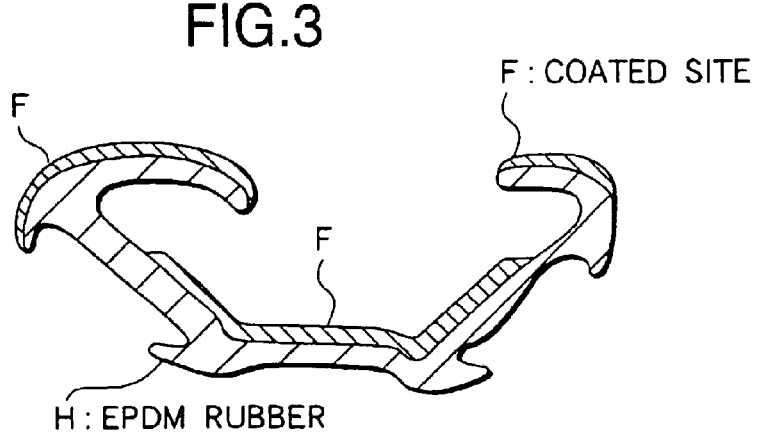
FIG. 3 is an illustration of another type of glass run product.
Figure 4:
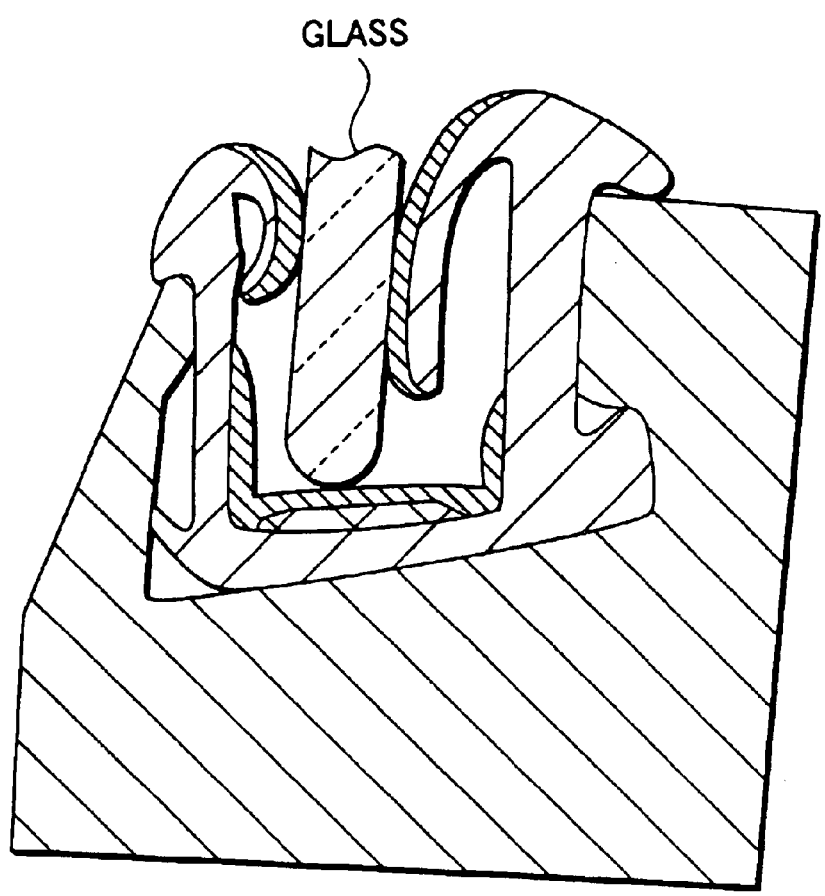
FIG. 4 illustrates how a glass run product is subjected to an abrasion test or a sliding resistance test

The present invention will now be described by way of reference to the Figures, which should in no way be construed as limiting the present invention. FIG. 1 is a schematic representation of an abrasion tester according to a method specified by the Japan Society for the Promotion of Scientific Research, in which D is an abrading glass plate (t=3.5 mm) and E is a coated sample. FIG. 2 is an illustration of a glass run product, in which F is a coated site, G is crosslinked PE, and H is EPDM rubber. FIG. 3 is an illustration of another glass run product, in which F is a coated site and H is EPDM rubber. FIG. 4 illustrates how a glass run product is subjected to an abrasion test or a sliding resistance test.

EXAMPLES

The present invention is illustrated in greater detail below with reference to the following Examples, but the invention should not be construed as being limited thereto.

Examples 1 and 2 and Comparative Example 1

The data in Table 1 demonstrates the advantages of the paint composition according to the invention. Two samples of a curable urethane polymer were mixed with two silane coupling agents to prepare two paint compositions, which were tested for adhesion, wear resistance and dynamic friction coefficient. The results are shown in Table 1 together with those of a comparative paint composition.

TABLE 1

| | | Ex. 1 | Ex. 2 | Comp. Ex. Ex. 3 |
|---|---|---|---|---|
| Amount (parts by wt.) | Curable urethane polymer | 100.0 | 100.0 | 100.0 |
| | Silane A | 8.0 | 8.0 | 8.0 |
| | Silane B | 8.0 | — | — |
| | Silane C | — | 8.0 | 8.0 |
| Adhesion (N/cm) | | 7.0 | 7.0 | 4.0 |
| Wear resistance (cycles)[1] | | 30,000 | 20,000 | 10,000 |
| Dynamic friction coefficient ($\mu K$) | | ≤0.1 | ≤0.1 | 0.2 |

Silance coupling agent A: γ-glycidoxypropyltrimethoxysilane (KBM-403 of Shin-Etsu Chemical Co., Ltd.; TSL 8350 of GE Toshiba Silicone; SH-6040 of Toray Dow Silicone)
Silane coupling agent B: 3-acryloxypropyltrimethoxysilane (KBM-5103 of Shin-Etsu Chemical Co., Ltd.)
Silane coupling agent C: γ-aminopropyltrimethoxysilane (KBM-903 of Shin-Etsu Chemical Co., Ltd.; TSL 8330 of GE Toshiba Silicone)
[1]Wear resistance: The coated surface was rubbed with a glass plate (see FIG. 1) until the substrate became exposed. The wear resistance of the sample was evaluated in terms of the number of cycles the glass plate was reciprocated before the substrate showed.

Examples 3 and 4 and Comparative Examples 2 and 3

The data in Table 2 demonstrates the advantages of the process for producing an automotive weather strip according to the invention. Extruded, heated and later cooled automotive weather strips were coated with two samples of urethane-based aqueous paint containing γ-aminopropyltrimethoxysilane as a silicone compound having an amino group, thereby preparing weather strip products, which were tested for wear resistance. The results are shown in Table 2 together with those of two comparative products.

TABLE 2

| | | Ex.3 | Ex4 | Comp. 2 | Comp. 3 |
|---|---|---|---|---|---|
| Treatment with silicon compound[1] | | yes | yes | no | no |
| Drying/curing conditions | | 200° C. × 10 min | 80° C. × 10 min | 200° C. × 10 min | 80° C. × 10 min |
| Wear resistance (cycles)[2] | EPDM rubber | 20,000 | 20,000 | 10,000 | 5,000 |
| | TPO | 5,000 | 5,000 | 2,000 | 100 |

[1]Silicone compound: Gamma-aminopropyltrimethoxysilane (KBM-903 of Shin-Etsu Chemical Co., Ltd.; TSL 8330 of GE Toshiba Silicone) was processed into a 10% solution by means of ion-exchanged water.
[2]Wear resistance: The coated surface was rubbed with a glass plate (see FIG. 1) until the substrate became exposed. The wear resistance of the sample was evaluated in terms of the number of cycles the glass plate was reciprocated before the substrate showed.

Examples 5-7 and Comparative Examples 4-6

The data in Table 3 demonstrates the advantages of the process for producing a glass run according to the invention. Glass run products made using γ-aminopropyltrimethoxysilane as a compound having an amino group were tested for wear resistance, resistance to sliding and adhesion to EPDM rubber and crosslinked polyethylene (PE). The results are shown in Table 3 together with those of comparative products.

TABLE 3

| | | Ex. 5 | Ex. 6 | Ex. 7 | Comp. 4 | Comp. 5 | Comp. 6 |
|---|---|---|---|---|---|---|---|
| Amount (parts by wt.) in coating film | Curable urethane polymer | 100.0 | — | 100.0 | 100.0 | — | 100.0 |
| | Silane coupling agent[1] | 10.0 | 10.0 | 10.0 | — | — | — |
| (F) | Ion-exchanged water | — | 90.0 | — | — | — | — |
| Wear resistance (cycles)[2] | | 40,000 | — | 40,000 | 10,000 | — | 10,000 |
| Sliding resistance (N/100 mm)[3] | | 3.0 | — | 3.0 | 5.0 | — | 5.0 |
| Adhesion to EPDM rubber_(H)[4] | | ○ | — | ○ | △ | — | △ |

TABLE 3-continued

|  | Ex. 5 | Ex. 6 | Ex. 7 | Comp. 4 | Comp. 5 | Comp. 6 |
|---|---|---|---|---|---|---|
| Adhesion to cross-linked PE (G)[4)] | ○ | ○ | — | X | X | — |
| Glass run product | FIG. 1 | FIG. 1 | FIG. 2 | FIG. 1 | FIG. 1 | FIG. 2 |

[1)]Silane coupling agent: Gamma-aminopropyltrimethoxysilane (KBM-903 of Shin-Etsu Chemical Co., Ltd.; TSL 8330 of GE Toshiba Silicone).
[2)]Wear resistance: A glass run product (see FIG. 2 or 3) was set on a test jig (see FIG. 4) and a glass plate (100 × 70 mm; t = 3.5 mm) was allowed to slide back and forth until the substrate became exposed in the coated lip portions and the bottom portion. The wear resistance was evaluated in terms of the number of cycles the glass plate was reciprocated before the substrate showed.
[3)]Sliding resistance: A glass run product (see FIG. 2 or 3) was set on a test jig (see FIG. 4) and a glass plate (100 × 70 mm, t = 3.5 mm) was allowed to slide for a distance of 70 mm; the resulting resistance was measured.
[4)]Adhesion: The coated surface was rubbed with a calico cloth under a load of 1 kg until either the coat transferred to the cloth or the substrate became exposed. (The criteria for rating were: ○, neither transfer to the cloth nor exposure of the substrate; X, the substrate became exposed).

1) Silane coupling agent: Gamma-aminopropyltrimethoxysilane (KBM-903 of Shin-Etsu Chemical Co., Ltd.; TSL 8330 of GE Toshiba Silicone.
2) Wear resistance: A glass run product (see FIG. 2 or 3) was set on a test jig (see FIG. 4) and a glass plate (100×70 mm; t=3.5 mm) was allowed to slide back and forth until the substrate became exposed in the coated lip portions and the bottom portion. The wear resistance was evaluated in terms of the number of cycles the glass plate was reciprocated before the substrate showed.
3) Sliding resistance: A glass run product (see FIG. 2 or 3) was set on a test jig (see FIG. 4) and a glass plate (100×70 mm, t=3.5 mm) was allowed to slide for a distance of 70 mm; the resulting resistance was measured.
4) Adhesion: The coated surface was rubbed with a calico cloth under a load of 1 kg until either the coat transferred to the cloth or the substrate became exposed. (The criteria for rating were: o, neither transfer to the cloth nor exposure of the substrate; X, the substrate became exposed).

As described on the foregoing pages, the paint composition for automotive weather strips according to the present invention can achieve strong adhesion to the EPDM rubber without corona discharge, primer application or other pretreatments on the substrate surface while exhibiting high wear resistance.

The processes for producing automotive weather strips according to the present invention do not require the as-applied coat to be cured completely in a drying oven but they permit it to be cured completely by the heat inertia of the drying step and they can also shorten the length of the drying oven or lower the drying temperature. The improvement in productivity is particularly noticeable if thermoplastic elastomers such as TPO are used as the substrate of automotive weather strips.

The processes for producing automotive glass runs according to the present invention are such that by using these processes, automotive glass runs having high wear resistance in the bottom portion while exhibiting high softness and flexibility in the lip portions can be produced efficiently and with minimum impact on the global environment.

While the present invention has been described in detail and with reference to specific examples thereof, it will be apparent to one skilled in the art that various changes and modifications can be made therein without departing from the spirit and scope thereof.

What is claimed is:

1. A process for producing an automotive glass run, comprising:
    coating a silane-crosslinkable polyethylene onto a semi-finished product of an automotive glass run;
    drying and curing the coated product in a heating furnace;
    applying a silicone compound having an amino group onto the coated surface; and
    heating the silicone compound-applied semi-finished product.
2. The process according to claim 1, wherein said silicone compound having an amino group which is to be applied is contained in a urethane resin-based aqueous paint.
3. The process according to claim 1, wherein said silicone compound having an amino group is applied in the form of a solution.

* * * * *